United States Patent
Tanigawa et al.

(10) Patent No.: US 6,690,382 B1
(45) Date of Patent: Feb. 10, 2004

(54) DISPLAY DEVICE CAPABLE OF COLOR DISPLAY USED IN OPERATION MODE SETTING OF IMAGE FORMATION APPARATUS

(75) Inventors: Tatsuya Tanigawa, Suita (JP); Koji Naito, Toyohashi (JP); Takatsugu Kuno, Aichi-Ken (JP); Junko Natsume, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/332,369

(22) Filed: Jun. 14, 1999

(30) Foreign Application Priority Data

Jun. 16, 1998 (JP) .............................. 10-168737

(51) Int. Cl.$^7$ ................................ G09G 5/36
(52) U.S. Cl. ...................... 345/593; 345/968
(58) Field of Search ................ 345/593, 594, 345/595, 968, 772, 839

(56) References Cited

U.S. PATENT DOCUMENTS

| | | | | |
|---|---|---|---|---|
| 4,639,881 A | * | 1/1987 | Zingher ...................... 345/839 |
| 5,343,304 A | * | 8/1994 | Nakai et al. ................. 358/296 |
| 5,343,312 A | * | 8/1994 | Hibi et al. ................... 358/520 |
| 5,390,005 A | * | 2/1995 | Kimoto et al. ............... 399/81 |
| 5,559,945 A | * | 9/1996 | Beaudet et al. ............. 345/841 |
| 5,844,559 A | * | 12/1998 | Guha .......................... 345/846 |
| 5,856,827 A | * | 1/1999 | Sudo ........................... 345/841 |
| 5,905,493 A | * | 5/1999 | Belzer et al. ................ 345/835 |
| 5,920,313 A | * | 7/1999 | Diedrichsen et al. ........ 345/767 |
| 6,184,881 B1 | * | 2/2001 | Medl ........................... 345/772 |

FOREIGN PATENT DOCUMENTS

| | | |
|---|---|---|
| JP | 07319336 | 12/1995 |
| JP | 07319363 | 12/1995 |
| JP | 10105001 | 4/1998 |

* cited by examiner

*Primary Examiner*—Steven Saras
*Assistant Examiner*—Leland R. Jorgensen
(74) *Attorney, Agent, or Firm*—McDermott, Will & Emery (57) ABSTRACT

An electronic display device that allows the hierarchy or system to which the display screen belongs to be easily identified, without narrowing the display area of a plurality of screens constituting a director structure. In the display device, a plurality of key input screens form a director structure in association with each other. The directory structure includes first to fourth hierarchy levels. Respective key input screens are located at any of the hierarchy. Upon depression of a transition key in a basic screen belonging to the first hierarchy, the display screen is switched to one of key input screens belonging to the second hierarchy. The display device changes the display color according to the hierarchy to which the key input screen belongs in providing a display of a key input screen.

6 Claims, 9 Drawing Sheets

DISPLAY DEVICE CAPABLE OF COLOR DISPLAY USED IN OPERATION MODE SETTING OF IMAGE FORMATION APPARATUS

This application is based on Japanese Patent Application No. 10-168737 filed in Japan, the contents of which are hereby incorporated by reference.

BACKGROUND OF THE INVENTION

1. Field of the Invention

The present invention relates to a display device capable of color display used in setting the operation mode of a copy machine and the like.

2. Description of the Background Art

As a conventional display device used in entering the operational conditions of an apparatus, a display device that can set the operational condition through the manipulation of an operator according to the instruction provided on the display screen is known. For example, in a display device used in a copy machine, the copy mode such as the copy sheet size, the copy scaling factor, the copy density and the like is set by the operator selecting an appropriate item from the menu on the display screen or entering a numeric following the instruction displayed on the screen. More specifically, a directory structure is provided with a screen directed to set the copy mode such as the copy magnification rate or the copy density and a menu screen to derive an appropriate screen related to the copy mode set screen, associated with each other according to the function. The appropriate screens are sequentially displayed at the display device according to the directory structure.

Figure 13:
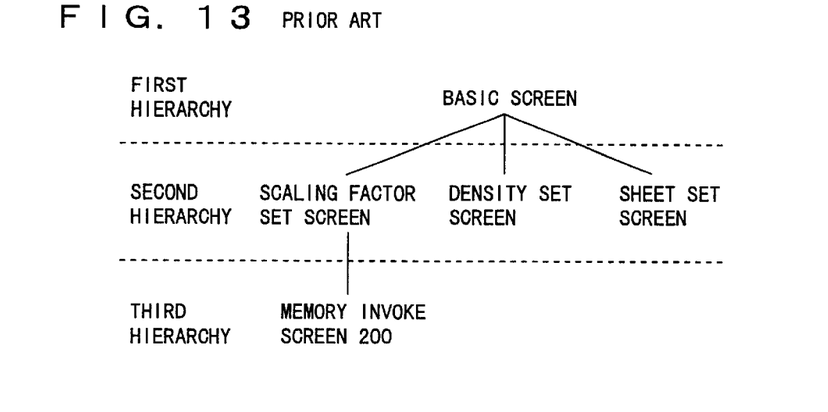
FIG. 13 shows a directory structure of a key input screen displayed at a conventional display device.

FIG. 13 shows an example of the directory structure of screens provided displayed on a conventional device. Referring to FIG. 13, the first hierarchy corresponds to the basic screen. The second hierarchy corresponds to the scaling factor set screen, density set screen, and sheet set screen. Each screen of the second hierarchy is associated with the basic screen. The third hierarchy corresponds to a memory invoke screen 200 associated with the scaling factor set screen of the second hierarchy. The solid line in FIG. 13 implies the association of the connected screens.

Figure 14:
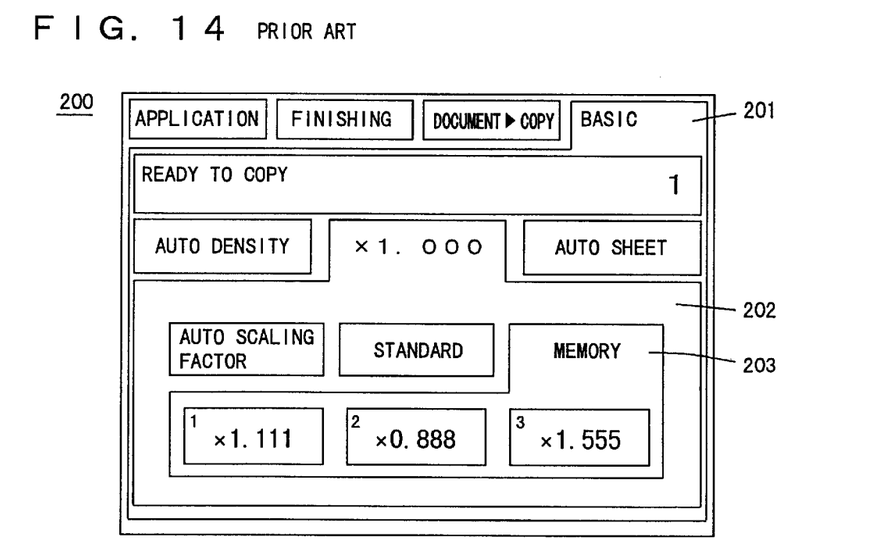
FIG. 14 shows a memory invoke screen displayed at a conventional display device.

When the copy mode is to be set using a screen of such a directory structure, first the basic screen of the first hierarchy is displayed. The screen of the second hierarchy can be displayed by depressing a transition key corresponding to a screen of a lower hierarchy in the basic screen. By depressing the transition key displayed in the scaling factor set screen of the second hierarchy, memory invoke screen 200 of the third hierarchy is displayed. FIG. 14 represents the display of memory invoke screen 200 of the third hierarchy at the display device. Memory invoke screen 200 includes display regions 201–203 to indicate the current working hierarchy for the operator. The screen format includes a region 202 of the scaling factor set screen within basic screen region 201. The display shows memory invoke screen region 203 in scaling factor set screen region 202. By confirming that display of display region 203 is displayed, the operator is aware that the current working screen corresponds to the third hierarchy. Thus, the hierarchical structure can be represented visually by displaying display regions 201–203.

The number of items to be set at the time of manipulation increases as the function of the apparatus becomes more versatile. As a result, the number of screens to be displayed increases. There will be a greater number of hierarchies in the directory structure. Increase in the number of hierarchies renders the operation complicated. There was the case where the operator becomes confused as to what hierarchy level he/she is now working or what function of the copy mode he/she is now entering.

When the hierarchical structure is to be represented visually, a region indicating the higher hierarchy (display regions 201–202 of FIG. 14) must be provided. This induces the problem that the region to set the copy mode (display region 203 of FIG. 14) becomes smaller.

SUMMARY OF THE INVENTION

An object of the present invention is to provide a display device superior in man-machine interface, capable of easily recognizing the hierarchy or system of the displayed screen without narrowing the region for display.

Another object of the present invention is to provide a display device superior in man-machine interface, capable of easily recognizing the association of the displayed screen with another screen without narrowing the region for display.

To achieve the above objects, a display device according to an aspect of the present invention includes a display unit selectively displaying a plurality of set screens to set a condition for image formation, and a control unit displaying a predetermined set screen of the plurality of set screens in the same color or same type of color, i.e. a similar color, at the display unit.

According to another aspect of the present invention, a display device includes a display unit to selectively display a plurality of set screens to set a condition for image formation, and a first key to alter a first set screen displayed at the display unit to a second set screen. The first key corresponds to a color associated with the second set screen.

According to a further aspect of the present invention, an image formation apparatus includes a display unit to selectively display a plurality of set screens to set a condition for image formation, a control unit to display a predetermined set screen of the plurality of set screens in the same color or similar color at the display unit, and an image forming device to form an image according to a set image formation condition.

According to the present invention, a display device superior in man-machine interface that allows the hierarchy or system pertaining to the displayed screen to be easily identified without reducing the display region.

According to the present invention, a display device superior in man-machine interface and that allows the association between the displayed screen and another screen to be easily identified without reducing the display region.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A display device according to an embodiment of the present invention will be described hereinafter with reference to the drawings. In the drawings, the same reference characters are allotted to the same or corresponding components.

First Embodiment

Figure 1:
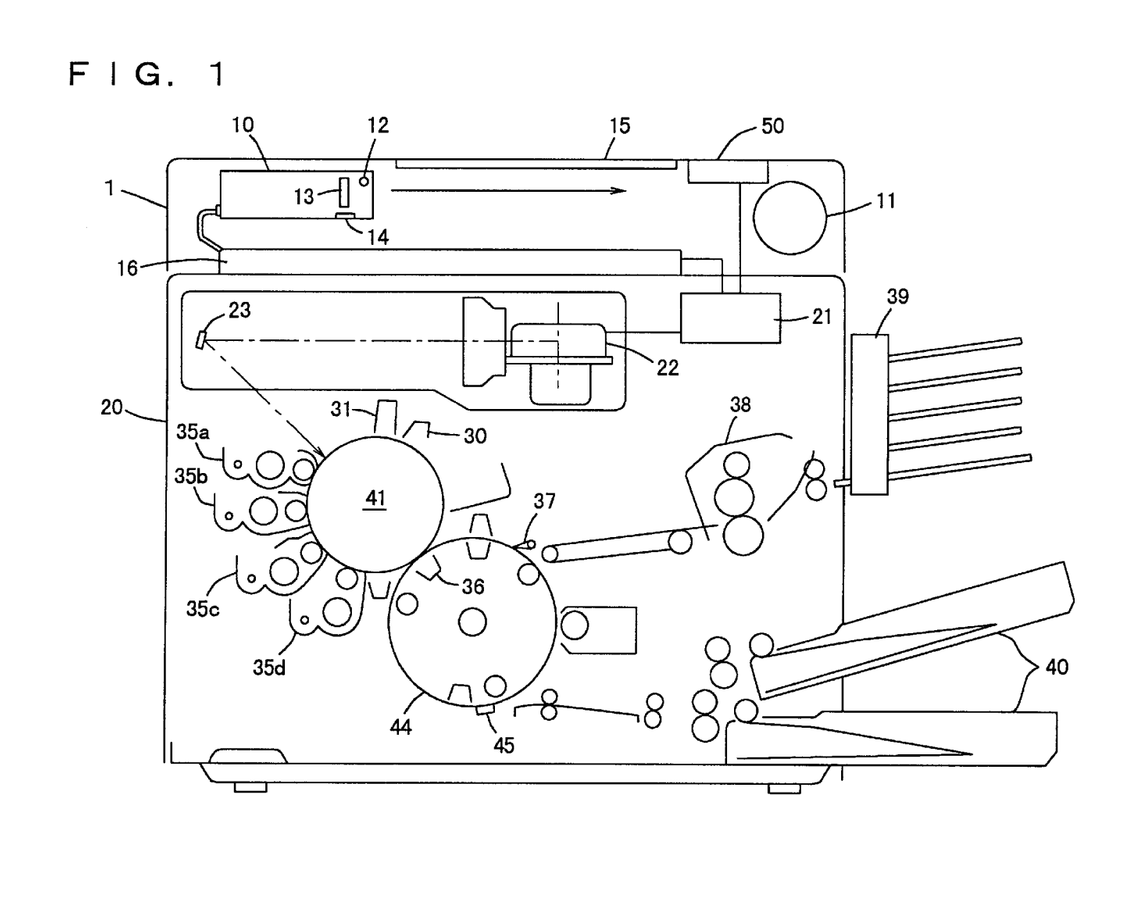
FIG. 1 is a sectional view of the entire structure of a digital color copy machine in which a display device according to an embodiment of the present invention is applied.

Referring to FIG. 1, a digital color copy machine includes an image reader 1 to read out an image of a document, and a copy unit 20 reproducing the read image.

Image reader 1 includes a scanner 10 reading the image of a document and converting the same into multi-bit electric signals, a motor 11 driving scanner 10, an image processing unit 16 processing the multi-bit electric signal converted by scanner 10, and a buffer 21 (FIFO memory) for synchronization to store the processed signal. Scanner 10 includes an exposure lamp 12 projecting a document mounted on a platen 15, a rod lens array 13 collecting the reflected light from the document, and a contact-type CCD color image sensor 14 converting the gathered light into electric signals. Scanner 10 is driven by motor 11 during the document reading operation to move in the direction of the arrow (sub scanning direction) to scan the document placed on platen 15. The image of the document irradiated with exposure lamp 12 is photoelectrically converted into multi-bit electric signals of the three colors of red, green and blue by CCD color image sensor 14. The multi-bit electric signal is converted into gradation data of 8 bits for each of yellow (Y), magenta (M), cyan (C) and black (Bk) by a read out signal processing unit 16. Gradation data of 8 bits are stored in synchronization buffer (FIFO memory) 21.

Copy unit 20 includes a print head unit 22, a photoconductor drum 41, toner developing devices 35a–35d, and a transfer drum 44. Following a predetermined gradation correction (γ correction) on the gradation data of 8 bits input via synchronization buffer 21, print head unit 22 D/A-converts the corrected image data to generate a laser diode driving signal. The semiconductor laser is modulated with the light emitting intensity according to this driving signal to output a laser beam. The laser beam output from print head unit 22 is reflected at a reflection mirror 23 to be directed onto photoconductor drum 41 that is driven in a rotating manner. Prior to this exposure, photoconductor drum 41 is irradiated with an eraser lamp 30 to be charged uniformly by a corona charger 31. By the exposure of photoconductor drum 41 in a uniformly charged state, an electrostatic latent image is formed on photoconductor drum 41. An appropriate one of cyan developing device 35a, magenta developing device 35b, yellow developing device 35c and black developing device 35d is selected to develop the electrostatic latent image on photoconductor drum 41.

A copy sheet of an appropriate size is supplied from a sheet cassette 40 to transfer drum 44. The copy sheet has its leading edge held by a chucking mechanism 45 so that the transfer position will not be shifted, and then wound around transfer drum 44. The toner image developed on photoconductor drum 41 is transferred onto the copy sheet wound around transfer drum 44 by a transfer charger 36.

This process of transferring a toner image onto the copy sheet is repeated for the four colors of yellow (Y), magenta (M), cyan (C) and black (Bk). Here, scanner 10 repeats a scanning operation in synchronization with the operation of photoconductor drum 41 and transfer drum 44. Then, the copy sheet is detached from transfer drum 44 by a claw 37 to be discharged to a staple sorter 39 through a fixing device 38.

An operation panel unit 50 is provided at the side of platen 15. The user sets the copy mode through operation panel unit 50. The digital color copy machine is controlled according to the set copy mode. For example, in staple sorter 39, the copy sheet is discharged according to the discharge manner set via operation panel unit 50. Here, the discharge manner includes the discharge of copy sheets continuously into one discharge tray, and the discharge of the same page into the same discharge tray, i.e., the stack manner.

Figure 2:
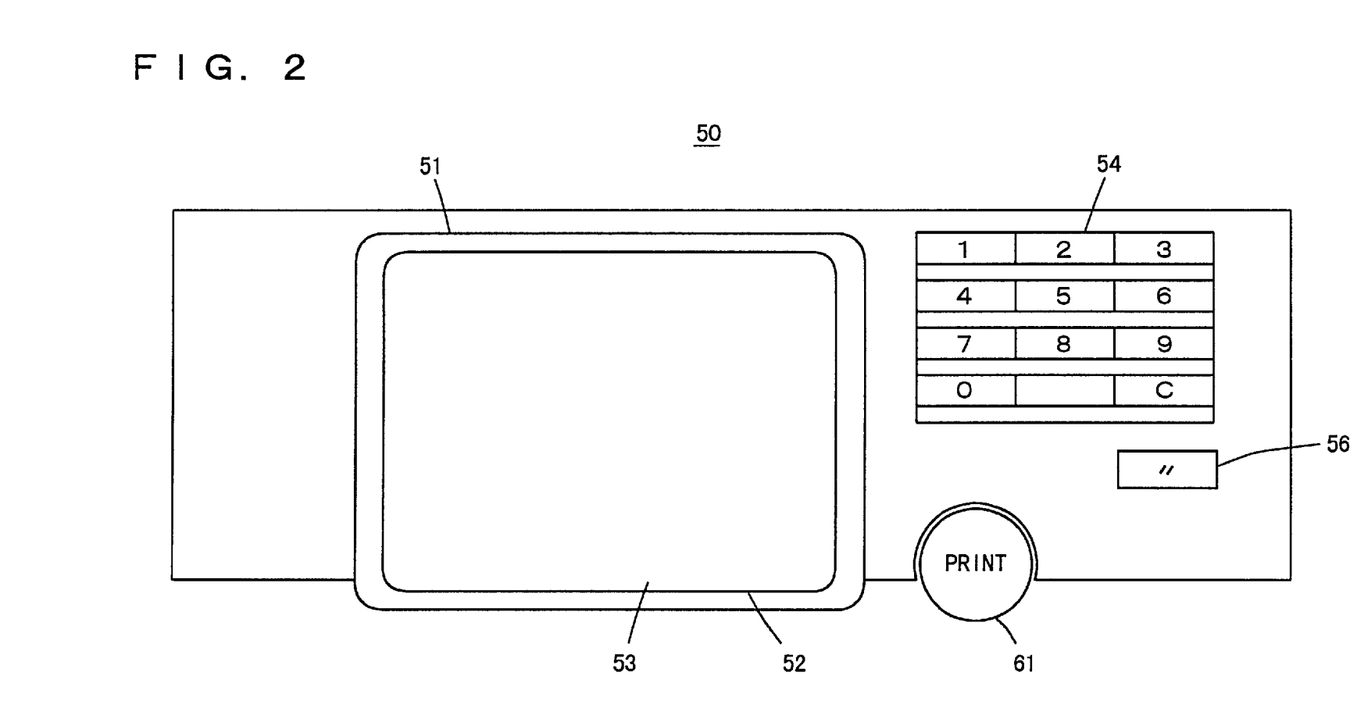
FIG. 2 is a plan view of an operation panel unit of a digital color copy machine.

Referring to FIG. 2, operation panel unit 50 includes a ten-key 54 to set the number of copies, the copy scaling factor, and the like, a print key 61 to designate the start of a copy operation, a LCD display unit 51, and a reset button 56. LCD display unit 51 includes a liquid crystal display device 52 and a touch switch 53 formed of a transparent member thereon. The screen displayed at liquid crystal display device 52 can be confirmed via touch switch 53 without parallax.

Figure 3:
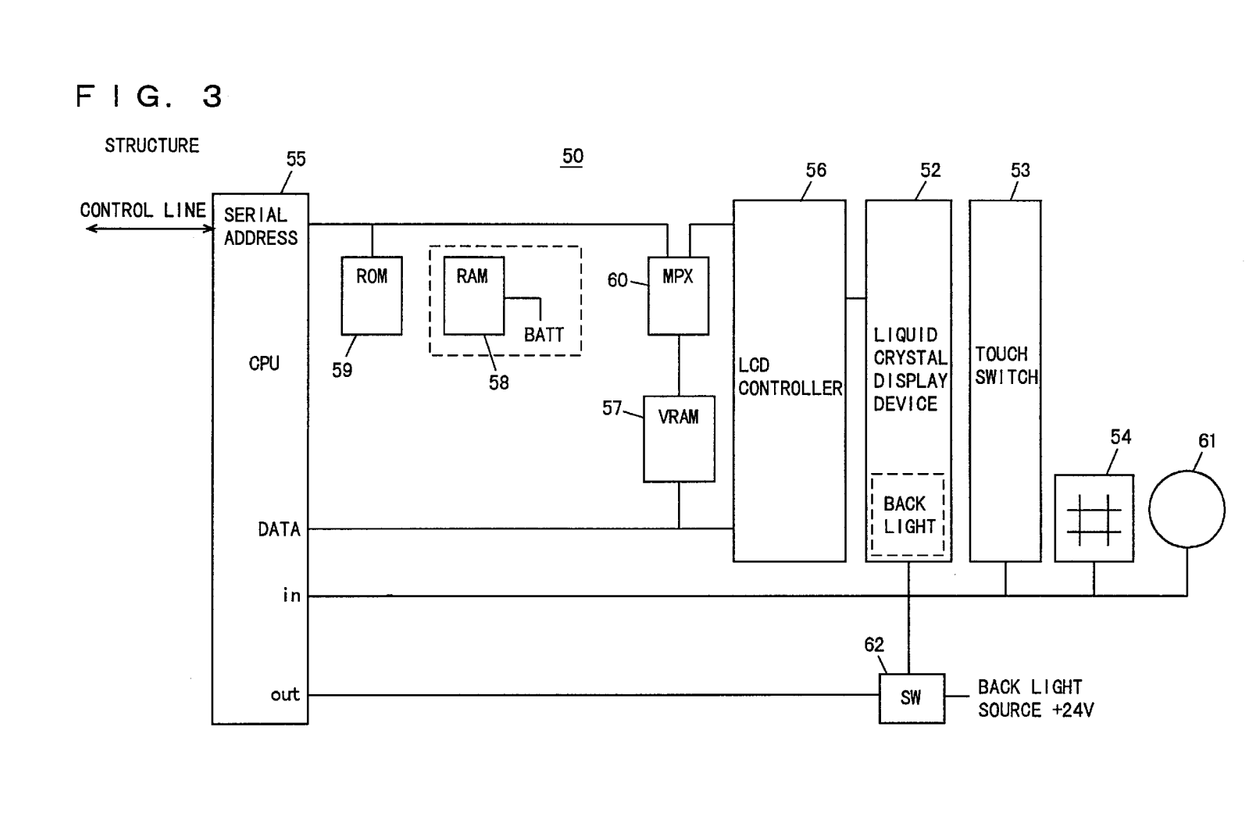
FIG. 3 is a block diagram showing a schematic structure of an operation panel unit.

Referring to FIG. 3, microcomputer (referred to as CPU hereinafter) 55 provides control of operation panel 50 and also transmit the operation mode or print start indication set by the operator to copy unit 20 shown in FIG. 1 via a control line. A ROM 59 stores the display process program executed by operation panel unit 50. A RAM 58 is backed up by a battery to store the copy conditions and the like set by the operator. A VRAM 57 stores the data of a screen to input various keys displayed on liquid crystal display device 52. A MPX (multiplexer) 60 combines the data of the key input screen read out from VRAM 57 with the data of the copy mode read out from RAM 58 (for example, the number of copies or copy scaling factor) to provide the combined data to LCD controller 56. LCD controller 56 provides data to liquid crystal display device 52 according to the data sent from CPU 55. Liquid crystal display device 52 includes a back light that is turned ON/OFF by a switch 62 to provide a screen display according to a control signal sent from LCD controller 56.

Touch switch 53 formed of a transparent member is provided on liquid crystal display device 52. Touch switch 53 is divided into a total of 100 switches, ten in the vertical direction and ten in the horizontal direction. The position data of the switch depressed by the operator is sent to CPU 55. CPU 55 recognizes the key depressed by the user out of the keys in the display screen of liquid crystal display device 52 according to the position data sent from touch switch 53 and the screen displayed on liquid crystal display device 52. CPU 55 responds to the content of the recognized key to send a control signal to RAM 58, VRAM 57 and LCD controller 56, whereby the display screen of liquid crystal display device 52 is switched.

Figure 4:
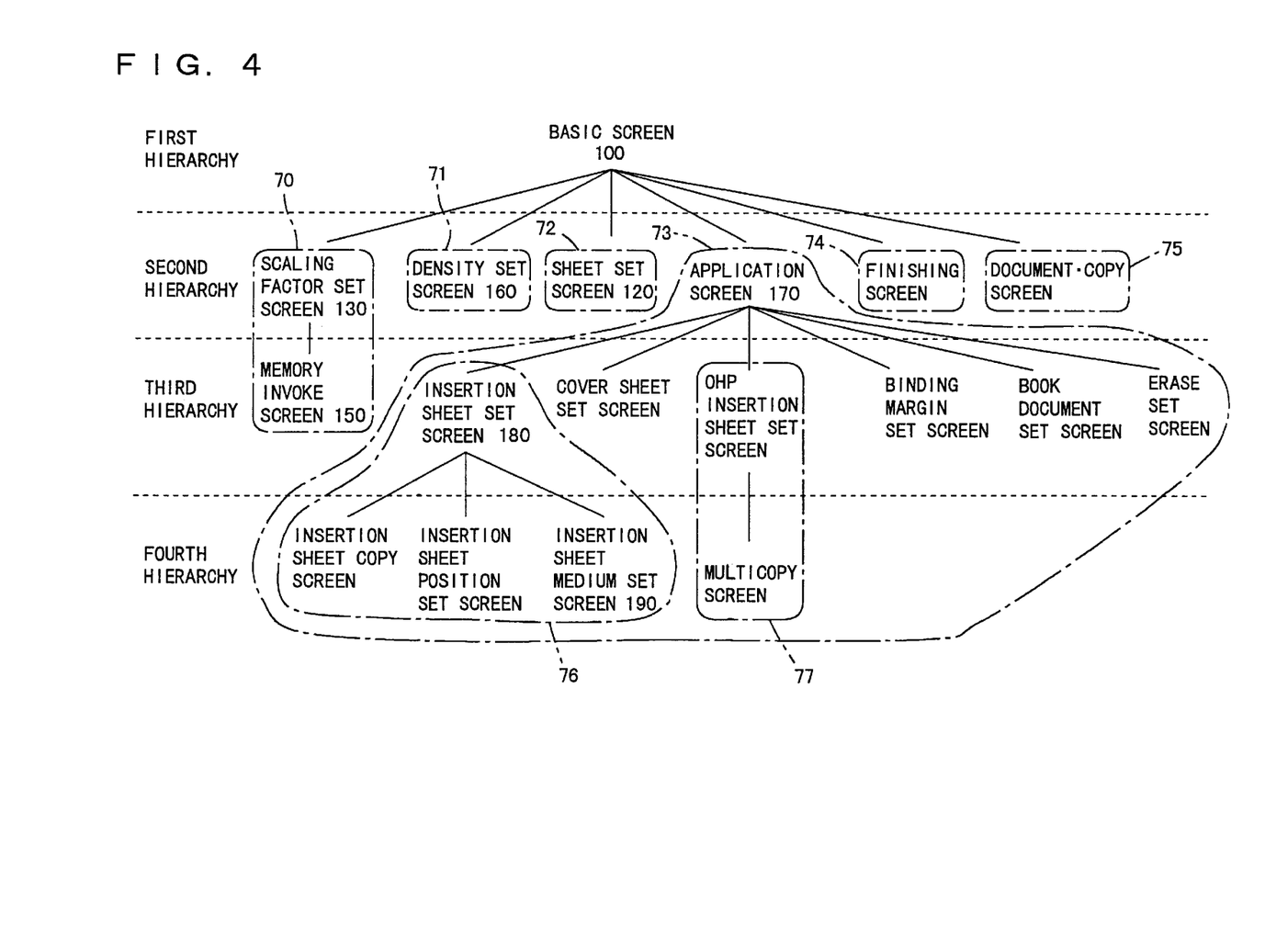
FIG. 4 shows an example of a directory structure of a key input screen displayed at the display device of the present embodiment.

Referring to the directory structure of FIG. 4, a basic screen 100 is located at the first hierarchy. At the second hierarchy, a scaling factor set screen 130, a density set screen 160, a sheet set screen 120, an application screen 170, a finishing screen, and a document.copy screen are located. Each screen is associated with basic screen 100 of the first hierarchy. At the third hierarchy, a memory invoke screen 150, an insertion sheet set screen 180, a cover sheet set screen, an OHP insertion sheet set screen, a binding margin set screen, a book document set screen, and an erase set screen are located. Memory invoke screen 150 is associated with scaling factor screen 130 of the second hierarchy. The other key input screens are associated with application screen 170 of the second hierarchy. At the fourth hierarchy, an insertion sheet copy screen, an insertion sheet position set screen, and an insertion sheet medium set screen 190, and multicopy screen are located. The insertion sheet copy screen, insertion sheet position set screen and insertion sheet medium set screen 190 are associated with insertion sheet set screen 180 of the third hierarchy. The multicopy screen is associated with the OHP insertion sheet set screen.

In FIG. 4, screens connected by solid lines are associated with each other. These associated screens are classified into respective types of systems over the first to fourth hierarchies. For example, scaling factor set screen 130 of the second hierarchy and memory invoke screen 150 of the third hierarchy are classified as a scaling factor set system 70. Application screen 170 of the second hierarchy, insertion sheet set screen 180, the cover sheet set screen, the OHP insertion sheet set screen, the binding margin set screen, the book document set screen, and the erase set screen of the second hierarchy, and the insertion sheet copy screen, the insertion sheet position set screen, the insertion sheet medium set screen, and the multicopy screen of the fourth hierarchy are classified as an application set system 73. Furthermore, application set system 73 is classified as an insertion sheet set system 76 and an OHP insertion sheet set system 77 at the third and fourth hierarchies, respectively. Insertion sheet set system 76 includes insertion sheet set screen 180 of the third hierarchy, and the insertion sheet copy screen, the insertion sheet position set screen, and the insertion sheet medium set screen of the fourth hierarchy. An OHP insertion sheet set system 77 includes the OHP insertion sheet set screen of the third hierarchy and the multicopy screen of the fourth hierarchy.

Figure 5:
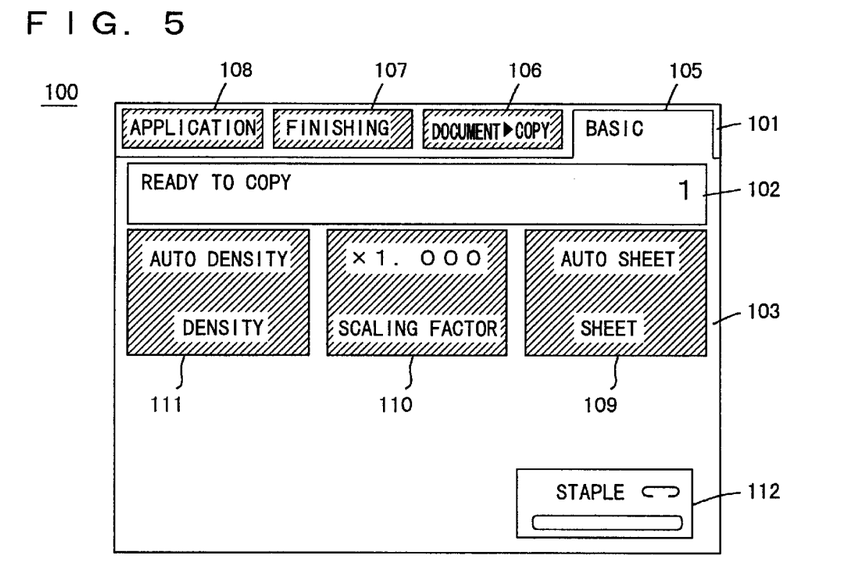
FIG. 5 shows an example of a basic screen displayed at the display device of the present embodiment.

Basic screen 100 of FIG. 5 is displayed when the power is turned on. Basic screen 100 is constituted by a selection key display section 101, a message display section 102, and a key display section 103. Selection key display section 101 provides the display of a transition key to switch to a key input screen display corresponding to a copy mode. The copy mode is mainly classified into 4 groups according to the function. The transition key includes a basic key 105, a document·copy key 106, a finishing key 107, and an application key 108. When the user touches transition keys 105–108 with his/her finger, a key input screen corresponding to the transition key is displayed on liquid crystal display device 52. When the user touches application key 108, for example, application screen 170 (refer to FIG. 10) is provided on liquid crystal display device 52.

Message display section 102 provides the display of the copy machine status such as "READY TO COPY" or "CURRENTLY COPYING", also prompting messages such as "SELECT SHEET SIZE", and the number of copies.

The mode set key and the transition key are displayed in key display section 103. The mode set key functions to set the details of the copy mode. A copy mode corresponding to the depressed key is set. For example, this corresponds to the display of staple key 112 in FIG. 5. In response to depression of staple key 112, the mode is set to staple together the sheets on staple sorter 39. The transition key functions to invoke another key input screen.

Referring to FIG. 5, basic screen 100 is a screen to set the basic copy mode. More specifically, the basic copy mode setting corresponds to the selection of the density, scaling factor, and the sheet for copy. A sheet key 109, a scaling factor key 110 and a density key 111 which are transition keys are displayed in key display section 103. In each of transition keys 109–111, the details of the copy mode currently set are displayed. It is therefore not necessary to invoke a key input screen to set a copy mode in order to confirm the set status of the copy mode. For example, "automatic sheet" is displayed at sheet key 109. This implies that a mode is set that selects from sheet cassette 40 a copy sheet of an appropriate size automatically from the scaling factor and the document size. Similarly, "×1.000" is displayed at scaling factor key 110. This implies that the scaling factor is set to 1.000. "Automatic density" is displayed at density key 111. This implies that a mode is set to automatically select a copy density according to the density of the image of the document.

CPU 55 detects the depression of any of transition keys 109–111 by the operator through tough key 53, and provides a display of a key input screen corresponding to the sensed transition key at liquid crystal display device 52. When an operator's input is not sensed for a predetermined period of time by touch key 53, CPU 55 initializes the set copy mode to display a basic screen 100 at liquid crystal display device 52.

Transition keys 106–111 of FIG. 5 are displayed in red. More specifically, the transition key is displayed in the color of the hierarchy pertaining to the key input screen displayed as a result of the transition key.

Figure 6:
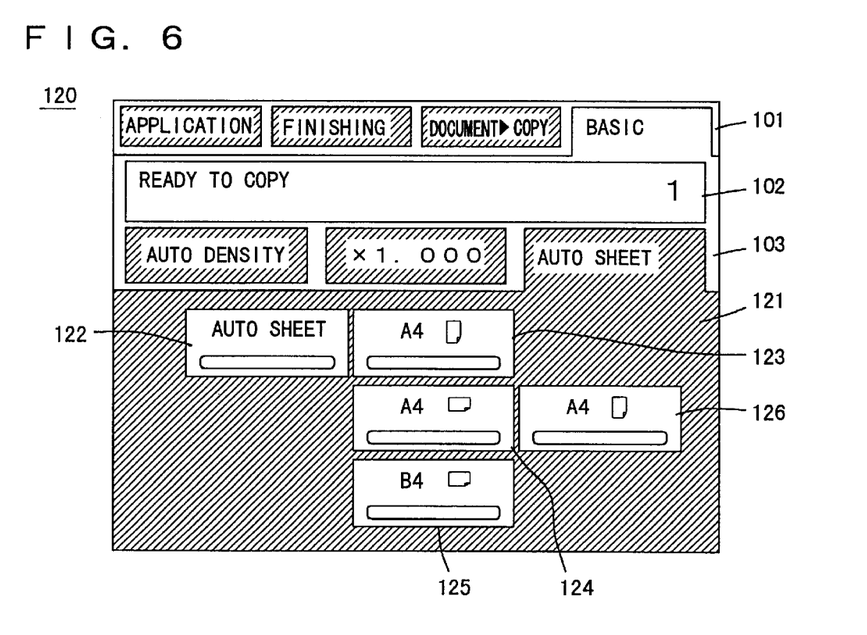
FIG. 6 shows an example of a sheet set screen displayed at the display device of the present embodiment.

FIG. 6 represents a sheet set screen on liquid crystal display device 52 when sheet key 109 which is a transition key of basic screen 100 is depressed by the operator. In key display section 103 of sheet set screen 120, sheet set section 121 is displayed in red. In sheet set section 121, a mode set key 122 to set an "automatic sheet" mode, and mode set keys 123–126 to set the size of the copy sheet are displayed. In response to depression of mode set key 122 by the operator, the "automatic sheet" mode is set. In response to depression of mode set keys 123–126 to select a copy sheet by the operator, the "automatic sheet" mode is cancelled and a copy sheet corresponding to the depressed mode set key is selected. When basic screen 100 of FIG. 5 is subsequently displayed at liquid crystal display device 52, a copy mode corresponding to the mode set key selected at sheet set screen 120 is displayed in sheet key 109.

Figure 7:
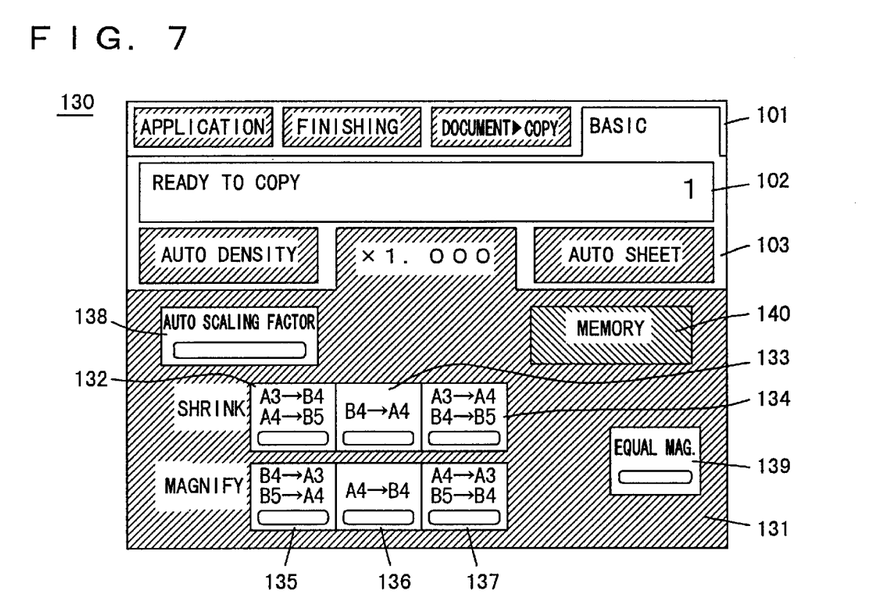
FIG. 7 shows an example of a scaling factor set screen displayed at the display device of the present embodiment.

Referring to FIG. 7, the scaling factor set screen appears on liquid crystal display device 52 when scaling factor key 110 which is a transition key is depressed by the operator in basic screen 100. In key display section 103 of scaling factor set screen 130, a scaling factor set section 131 is displayed in red.

Figure 8:
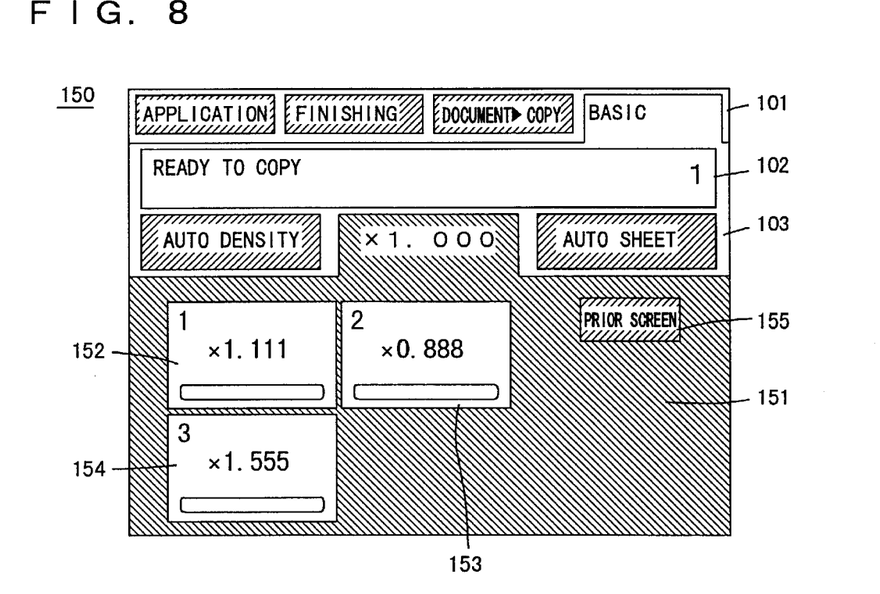
FIG. 8 shows an example of a memory invoke screen displayed at the display device of the present embodiment.

A mode set key 138 to set an "automatic scaling factor" mode, mode set keys 132–139 to set a predetermined scaling factor, and a memory key 140 for transition to a key input screen to invoke the scaling factor prestored in the memory by the operator are displayed in scaling factor set section 131. Memory key 140 is a transition key, displayed in blue. In response to depression of mode set key 138 to set "automatic scaling factor", the copy mode is set to a mode of automatically setting an appropriate scaling factor from the copy sheet size and the document size. In response to depression of mode set keys 132–139 to set a predetermined scaling factor, the copy mode is set to a scaling factor corresponding to respective mode set keys. Then, basic screen 100 shown in FIG. 5 is displayed on liquid crystal display device 52. The scaling factor set at scaling factor set screen 130 is displayed in scaling factor key 110. Upon depression of memory key 140 which is a transition key, memory invoke screen 150 of FIG. 8 is displayed at liquid crystal display device 52. Memory invoke screen 150 is a screen to invoke the scaling factor selected by the operator and set the copy mode to that scaling factor. In key display section 103 of memory invoke screen 150, scaling factor memory section 151 is displayed in blue. In scaling factor memory section 151, scaling factor memory keys 152–154 which are mode set keys, and a preceding screen key 155 which is a transition key are displayed in scaling factor memory section 151. Preceding screen key 155 is displayed in red. Upon depression of any of scaling factor memory keys 152–153, the mode is set to the scaling factor predetermined by the operator. Then, the scaling factor preset by the user is displayed in scaling factor key 110 when basic screen 100 is displayed at liquid crystal display device 52. Upon depression of preceding screen key 155, scaling factor set screen 130 is displayed at liquid crystal display device 52.

Figure 9:
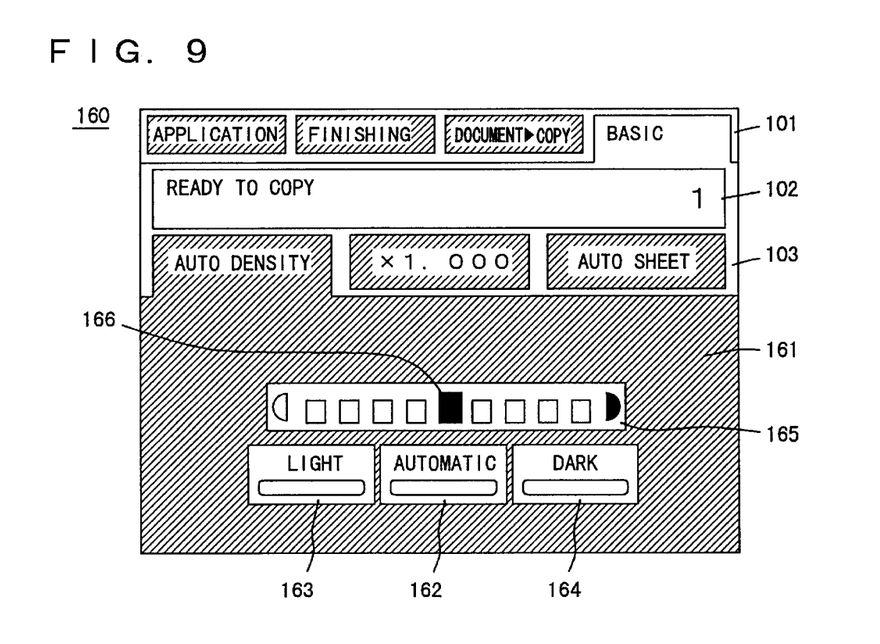
FIG. 9 shows an example of a density set screen displayed at the display device of the present embodiment.

Upon depression of density key 111 in basic screen 100, density set screen 160 shown in FIG. 9 is displayed. In key display section 103 of density set screen 160, density set section 161 is displayed in red. A mode set key 162 to set the "automatic density" mode, and mode set keys 163 and 164 to manually set the density are displayed in density set section 161. Upon depression of automatic density key 162, the mode is set to "automatic density". Upon depression of mode set keys 163 and 164 to manually set the density, the density of various levels such as "dark", "slightly dark", "normal", "slightly light" and "light" are set. Then, when basic screen 100 is displayed at liquid crystal display device 52, the display of "automatic density", if set, or the density set manually appears in density key 111.

Figure 10:
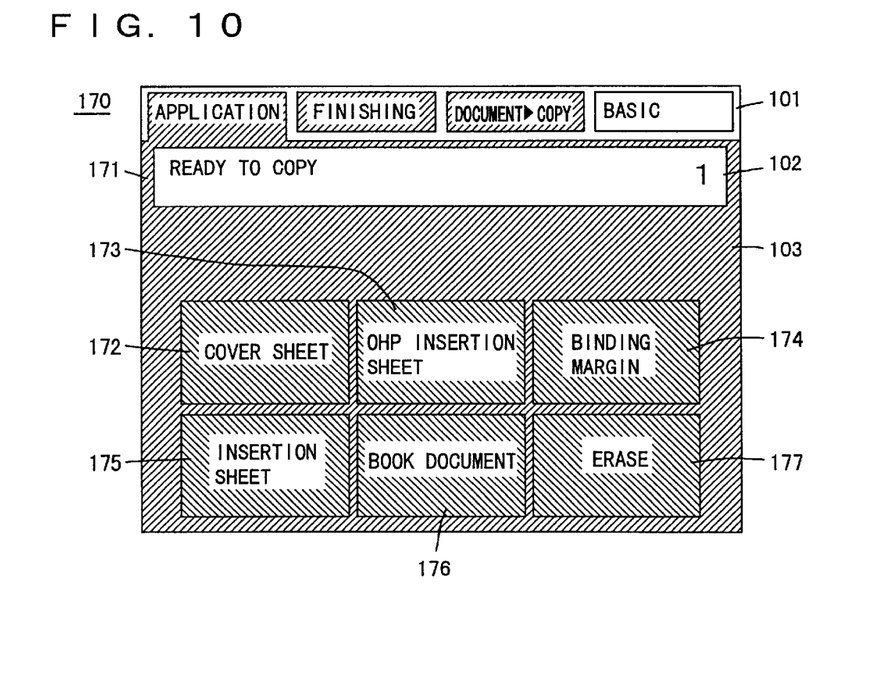
FIG. 10 shows an example of an application screen displayed at the display device of the present embodiment.

Application screen 170 of FIG. 10 is displayed at liquid crystal display device 52 when application key 108 which is a transition key of basic screen 100 is depressed by the operator. In key display section 103 of application screen 170, application set section 171 is displayed in red. In application set section 171, transition keys 172–177 are displayed in blue to switch the key input screen display to set "cover sheet", "insertion sheet", "OHP insertion sheet", "book document", "binding margin", "erase" copy modes.

Figure 11:
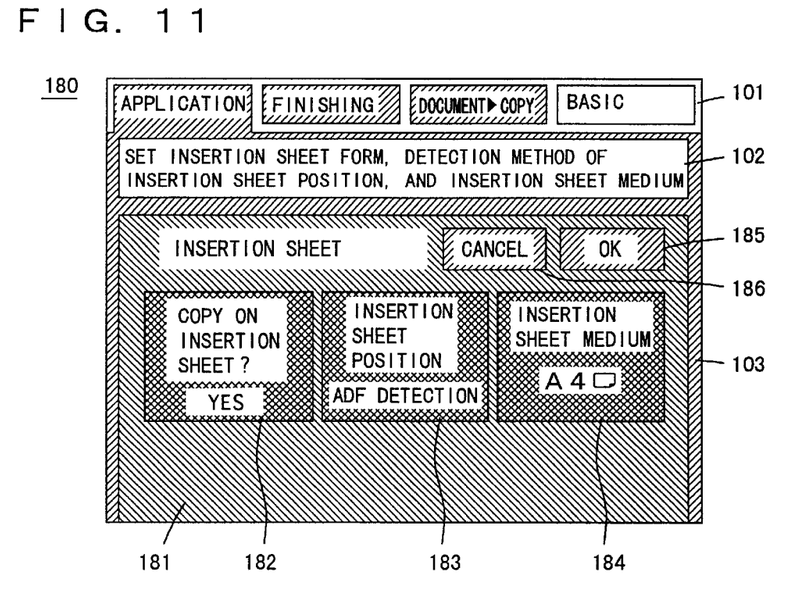
FIG. 11 shows an example of an insertion sheet set screen displayed at the display device of the present embodiment.

FIG. 11 represents insertion sheet set screen 180 displayed at liquid crystal display device 52 when insertion sheet key 175 in application screen 170 is depressed by the operator. In key display section 103 of insertion sheet set screen 180, insertion sheet set section 181 is displayed in blue. In insertion sheet set section 181, a transition key 182 for transition to a key input screen to designate whether to copy or not on the insertion sheet, a transition key 183 for transition to a key input screen to set the position to insert the sheet, and a transition key 184 for transition to a key input screen to set the size of the insertion sheet are displayed in yellow. Then, an "OK" key 185 to display application screen 170 after ascertaining the setting of the insertion sheet mode, and a "cancel" key 186 to display application screen 170 after canceling the "insertion sheet" mode are displayed in blue.

Figure 12:
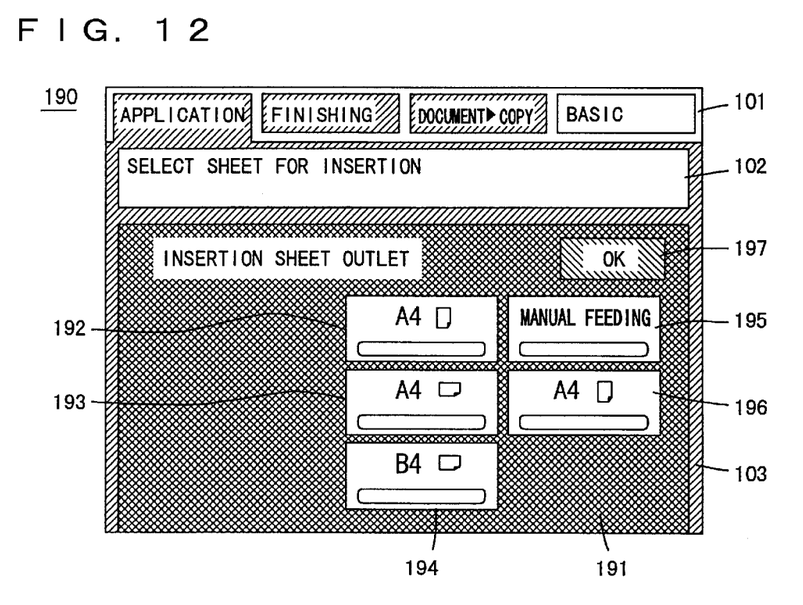
FIG. 12 shows an example of an insertion sheet medium set screen displayed at the display device of the present embodiment.

Insertion sheet medium set screen 190 of FIG. 12 appears when the operator depresses transition key 184 for transition to a key input screen to set the size of the insertion sheet in insertion sheet set screen 180. In key display section 103 of insertion sheet medium set screen 190, insertion sheet medium set section 191 is displayed in yellow. Mode set keys 192–196 to select the size of the insertion sheet, and an "OK" key 197 ascertaining the insertion sheet size and displaying insertion sheet set screen 180 on liquid crystal display device 52 are displayed in insertion sheet medium set section 191. "OK" key 197 is displayed in blue. Upon depression of mode set keys 192–196, the mode is set to the insertion sheet corresponding to the depressed mode set key.

In the display device of the first embodiment, each hierarchy of the screen is displayed in an appropriate color. The operator can easily identify which hierarchy the currently working screen belongs to by just looking at the screen. The display area does not have to be reduced in area as in the conventional case. Therefore, operation error can be reduced.

Although the display hue of respective screens differs depending on the hierarchy in the present embodiment, the lightness of the displayed color of the screen can be made darker as the level of the hierarchy increases. Here, the hierarchy level refers to the first to fourth levels of hierarchy shown in FIG. 4, for example. The second hierarchy is higher in level than the first hierarchy. Since the operator can identify which hierarchy the currently worked screen belongs to by the lightness in addition to the hue, the level of the hierarchy can easily be identified. Alternatively, the hue does not have to be changed, and only the lightness altered for different hierarchy levels.

In the present embodiment, the color of the transition key displayed in the screen at liquid crystal display device 52 is set identical to that of the color of the destination key input screen display. Accordingly, the level of hierarchy to which transition is made can be identified at a glance by the depression of the relevant transition key. Therefore, operation error can be reduced. A similar effect can be obtained by displaying the transition key and the key input screen in related colors (for example similar colors), instead of displaying the transition key and the key input screen in the same color.

Second Embodiment

A display device according to a second embodiment of the present invention will be described hereinafter. In contrast to the display device of the first embodiment displaying the key input screen in different colors for respective hierarchies, the display device of the second embodiment sets a different display color for each system to which the display the key input screen belongs. The remaining elements are similar to those of the display device of the first embodiment. Therefore, description thereof will not be repeated.

The hierarchical structure of the key input screen displayed at liquid crystal display device 52 is as shown in FIG.

4. Here, the system is defined by classifying the key input screen according to its function. More specifically, there are provided scaling factor set system 70, density set system 71, sheet set system 72, application set system 73, finishing set system 74, and document-copy set system 75. The color of the key input screen display is differentiated for every system. Specifically, scaling factor set screen 130 is displayed in red, density set screen 160 is displayed in blue, sheet set screen 120 is displayed in yellow, application screen 170 is set in green, finishing screen is set in orange, and the document-copy screen is displayed in pink. The screens belonging to the third hierarchy or the fourth hierarchy corresponding to the same system are displayed in the same color.

Sheet set screen 120 of FIG. 6 provides the display of sheet set section 121 in yellow. In scaling factor set screen 130 of FIG. 7, scaling factor set section 131 is displayed in red, and memory key 140 which is a transition key is displayed in red of a lightness lower in level than that of the red color of scaling factor set section 131. In application screen 170 of FIG. 10, application set section 171 is displayed in green, and transition keys 172–177 are displayed in green of a darker shade than the green of application set section 171. In insertion sheet set screen 180 of FIG. 11, insertion sheet set section 181 is displayed in green identical to the green of transition keys 172–177 in application screen 170, whereas transition keys 182–184 are displayed in green of a lightness level lower than that of the green of insertion sheet set section 181. Transition keys 185–186 are displayed in green identical to that of application set section 171 in application screen 170.

In insertion sheet medium set screen 190 of FIG. 12, insertion sheet medium set section 191 is displayed in green identical to the green of transition keys 182–184 in insertion sheet set screen 180, whereas transition key 197 is displayed in green identical to the green of insertion sheet set section 181 of insertion sheet set screen 180.

Application set system 73 can be further subdivided with insertion sheet set system 76 and OHP insertion sheet set system 77. In order to clearly show that these systems belong to application set system 73, the color of the key input screen display belonging to insertion sheet set system 76 and OHP insertion sheet set system 77 can be set to a color associated with the display color of application screen 170 (for example, a similar color).

In the display device of the second embodiment, the screen is displayed in a different color for each system and the lightness of the color reduced in proportion to a higher level of hierarchy. Therefore, the operator can identify at a glance which system or which hierarchy level the currently worked screen belongs to. The operator can easily make a transit to the desired set screen, reducing any operational error.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus comprising:

a display unit to display a set screen to set an operational mode of said image formation apparatus;

switch means for switching the set screen displayed on said display unit with directions of an operator so that one of a plurality of different set screens classified into a plurality of hierarchies is selected and displayed; and control means for controlling said display unit to display the set screen in a different color according to the hierarchies to which the set screen belongs, wherein said plurality of hierarchies correspond to a ranking of said plurality of different set screens with respect to each other, and only one of the plurality of different set screens is selected and displayed at a time on the display unit.

2. The image formation apparatus according to claim 1, wherein each set screen is displayed in the same size.

3. The image formation apparatus according to claim 1, wherein each set screen is displayed on the same area.

4. An image formation apparatus comprising:

a display unit to display a set screen to set an operational mode of said image formation apparatus;

switch means for switching the set screen displayed on said display unit with directions of an operator so that one of a plurality of set screens classified into a plurality of systems for every related function is selected and displayed, said plurality of set screens being further classified in a plurality of hierarchies; and control means for controlling said display unit to display screens of different levels of hierarchy, but belonging to a common system, in a same color while displaying screens belonging to a common hierarchy, but belonging to a different system, a different color.

5. The image formation apparatus according to claim 4, wherein each set screen is displayed in the same size.

6. The image formation apparatus according to claim 5, wherein each set screen is displayed on the same area.

* * * * *